US007224681B2

(12) United States Patent
Kramer et al.

(10) Patent No.: US 7,224,681 B2
(45) Date of Patent: May 29, 2007

(54) PROCESSOR WITH DYNAMIC TABLE-BASED SCHEDULING USING MULTI-ENTRY TABLE LOCATIONS FOR HANDLING TRANSMISSION REQUEST COLLISIONS

(75) Inventors: David B. Kramer, Austin, TX (US); David P. Sonnier, Austin, TX (US); Leslie Zsohar, Round Rock, TX (US)

(73) Assignee: Agere Systems Inc., Allentown, PA (US)

( * ) Notice: Subject to any disclaimer, the term of this patent is extended or adjusted under 35 U.S.C. 154(b) by 1025 days.

(21) Appl. No.: 10/085,223

(22) Filed: Feb. 28, 2002

(65) Prior Publication Data

US 2003/0161291 A1    Aug. 28, 2003

(51) Int. Cl.
  *H04B 7/212* (2006.01)
  *H04L 12/28* (2006.01)
  *H04L 12/56* (2006.01)
(52) U.S. Cl. .................................. 370/347; 370/395.4
(58) Field of Classification Search ................ 370/347, 370/230, 263, 395, 229, 236, 342, 330, 235, 370/399, 412, 395.4, 462, 341, 346, 338, 370/397, 449, 445; 725/50; 455/452; 718/100; 375/133, 132
See application file for complete search history.

(56) References Cited

U.S. PATENT DOCUMENTS

| | | | | |
|---|---|---|---|---|
| 5,694,554 A | * | 12/1997 | Kawabata et al. | ........... 370/412 |
| 5,712,851 A | * | 1/1998 | Nguyen et al. | ............. 370/399 |
| 5,889,763 A | * | 3/1999 | Boland et al. | .............. 370/235 |
| 6,011,775 A | * | 1/2000 | Bonomi et al. | ............. 370/230 |
| 6,011,798 A | * | 1/2000 | McAlpine | .............. 370/395.42 |
| 6,028,599 A | * | 2/2000 | Yuen et al. | .................... 725/50 |
| 6,069,878 A | * | 5/2000 | Christensen | ................ 370/263 |
| 6,374,405 B1 | | 4/2002 | Willard | |
| 6,377,583 B1 | | 4/2002 | Lyles et al. | |
| 6,389,019 B1 | * | 5/2002 | Fan et al. | .............. 370/395.42 |
| 6,414,963 B1 | | 7/2002 | Gemar | |
| 6,477,144 B1 | * | 11/2002 | Morris et al. | ............ 370/230.1 |
| 6,483,839 B1 | | 11/2002 | Gemar et al. | |
| 6,526,062 B1 | | 2/2003 | Milliken et al. | |
| 6,535,512 B1 | * | 3/2003 | Daniel et al. | ............ 370/395.1 |
| 6,603,766 B1 | * | 8/2003 | Zifroni et al. | ........... 370/395.6 |
| 6,661,774 B1 | * | 12/2003 | Lauffenburger et al. | . 370/230.1 |
| 6,667,977 B1 | | 12/2003 | Ono | |

(Continued)

*Primary Examiner*—Chi Pham
*Assistant Examiner*—Prenell Jones (57) ABSTRACT

A processor includes scheduling circuitry for scheduling data blocks for transmission from a plurality of transmission elements. The scheduling circuitry has at least one time slot table accessible thereto, and is configured for utilization of the time slot table in scheduling the data blocks for transmission. The time slot table includes a plurality of locations, with each of the locations corresponding to a transmission time slot and being configurable for storing identifiers of at least two of the transmission elements. In an illustrative embodiment, a given one of the locations in the time slot table stores in a first portion thereof an identifier of a first one of the transmission elements that has requested transmission of a block of data in the corresponding time slot, and stores in a second portion thereof an identifier of a second one of the transmission elements that has requested transmission of a block of data in the corresponding time slot. Furthermore, additional transmission elements generating colliding requests for the given location can be linked between the first and second transmission elements using a linking mechanism. The use of multi-entry time slot table locations to accommodate collisions between transmission element requests considerably facilitates the maintenance of desired traffic shaping requirements.

20 Claims, 5 Drawing Sheets

U.S. PATENT DOCUMENTS

| | | |
|---|---|---|
| 6,721,325 B1 | 4/2004 | Duckering et al. |
| 6,735,207 B1* | 5/2004 | Prasad et al. ............ 370/395.7 |
| 2002/0080721 A1* | 6/2002 | Tobagi et al. ............... 370/236 |
| 2002/0122403 A1* | 9/2002 | Hashem et al. ............. 370/342 |
| 2002/0142780 A1* | 10/2002 | Airy et al. .................. 455/452 |
| 2002/0159411 A1* | 10/2002 | Airy et al. .................. 370/330 |
| 2003/0021228 A1* | 1/2003 | Nakano et al. ............. 370/229 |
| 2003/0046414 A1 | 3/2003 | Pettyjohn et al. |
| 2003/0081624 A1 | 5/2003 | Aggarwal et al. |
| 2005/0050543 A1* | 3/2005 | Ogus et al. ................. 718/100 |

\* cited by examiner

| POINTER | DESCRIPTION |
|---|---|
| AP | ACTUAL POINTER – POINTS TO THE TIME SLOT THAT CORRESPONDS TO ACTUAL TIME |
| HP | HEAD POINTER – POINTS TO THE FIRST ELEMENT IN THE WAITING ROOM |
| TP | TAIL POINTER – POINTS TO THE LAST ELEMENT IN THE WAITING ROOM |

PROCESSOR WITH DYNAMIC TABLE-BASED SCHEDULING USING MULTI-ENTRY TABLE LOCATIONS FOR HANDLING TRANSMISSION REQUEST COLLISIONS

RELATED APPLICATIONS

The present invention is related to the inventions described in U.S. patent application Ser. No. 10/085,219 entitled "Processor With Dynamic Table-Based Scheduling Using Linked Transmission Elements For Handling Transmission Request Collisions," U.S. patent application Ser. No. 10/085,222 entitled "Processor With Table-Based Scheduling Using Software-Controlled Interval Computation," and U.S. patent application Ser. No. 10/085,771 entitled "Processor With Software-Controlled Programmable Service Levels," all filed concurrently herewith and hereby incorporated by reference herein.

1. Field of the Invention

The present invention relates generally to techniques for transmitting packets or other blocks of data through a network, and more particularly to a network processor or other type of processor configured for use in performing operations such as routing or switching of such data blocks.

2. Background of the Invention

A network processor generally controls the flow of data between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

An important function of a network processor involves the scheduling of packets or other data blocks for transmission, e.g., for transmission to the switch fabric from the network or vice versa. A network processor typically includes a scheduler for implementing this function. One way that such a scheduler may be implemented involves the use of demand-based time slot tables, also referred to as dynamic time slot tables. In these cases, a significant problem that can arise relates to the manner in which the scheduler deals with transmission request collisions, that is, simultaneous requests for transmission in the same time slot. Typically, only a single block of data can be transmitted in a given time slot. When multiple data blocks request transmission in the same time slot, only one of the blocks can be transmitted, and the other blocks must be delayed or dropped. It should be noted that this problem is specific to demand-based time slot tables, and is generally not an issue for static time slot tables which can be configured to avoid collisions altogether.

The above-noted problem with demand-based time slot tables makes it difficult to maintain a desired traffic shaping for the transmitted data blocks in the corresponding network processor. This in turn complicates the provision of desired service levels, e.g., specified quality of service (QoS) or class of service (CoS) levels, for particular network connections supported by the network processor.

A need therefore exists for improved scheduling techniques for use in a network processor, which are able to accommodate multiple simultaneous collisions in transmission requests without undermining the provision of QoS, CoS or other desired service levels for corresponding network connections.

SUMMARY OF THE INVENTION

The invention provides improved techniques for scheduling data blocks for transmission in a network processor or other type of processor.

In accordance with one aspect of the invention, a processor includes scheduling circuitry for scheduling data blocks for transmission from a plurality of transmission elements. The scheduling circuitry has at least one time slot table accessible thereto, and is configured for utilization of the time slot table in scheduling the datablocks for transmission. The time slot table includes a plurality of locations, with each of the locations corresponding to a transmission time slot and being configurable for storing identifiers of at least two of the transmission elements.

In an illustrative embodiment, a given one of the locations in the time slot table stores in a first portion thereof an identifier of a first one of the transmission elements that has requested transmission of a block of data in the corresponding time slot, and stores in a second portion thereof an identifier of a second one of the transmission elements that has requested transmission of a block of data in the corresponding time slot. Furthermore, additional transmission elements generating colliding requests for the given location can be linked between the first and second transmission elements using a linking mechanism. For example, the identifiers of the transmission elements may have a multi-bit structure for allowing a given one of the transmission element identifiers to be linked to another of the transmission element identifiers, thereby creating a linked list of such identifiers.

In the event of a collision between multiple transmission elements requesting a given one of the time slots, an identifier of a first one of the requesting transmission elements may be entered into a first portion of the corresponding location in the time slot table, an identifier of a final one of the requesting elements may be entered into a second portion of the corresponding location in the time slot table, and an identifier of an additional one of the requesting elements may be linked to at least one of the identifier of the first requesting element and the identifier of the second requesting element, a linked list of the multiple requesting elements thereby being created for the corresponding location in the time slot table. Upon transmission of a data block from one of the requesting transmission elements in the linked list of elements, a determination is made as to whether there are any further elements linked to that element, and for a given such further element the transmission of a data block therefrom is scheduled.

In accordance with another aspect of the invention, the scheduling circuitry maintains a set of pointers for the time slot table. The set of pointers may include an actual pointer pointing to a location in the time slot table corresponding to actual time, a head pointer pointing to a first element of a linked list of multiple requesting transmission elements associated with a given time slot, and a tail pointer pointing to a final element of the linked list of multiple requesting transmission elements associated with the given time slot. The actual pointer advances by one table location for each of the data blocks transmitted, i.e., for each transmission event associated with the time slot table. The head pointer and tail pointer collectively define a dynamic waiting room for at least a subset of the multiple requesting transmission elements associated with the given time slot.

The use of multi-entry time slot table locations in accordance with the invention to accommodate collisions between transmission element requests considerably facilitates the maintenance of desired traffic shaping requirements. More particularly, the scheduling techniques of the invention can efficiently handle multiple simultaneous collisions of transmission requests, thereby facilitating the provision of QoS, CoS or other desired service levels for network connections.

DETAILED DESCRIPTION OF THE INVENTION

The invention will be illustrated herein in conjunction with an exemplary system for processing data for transmission through a network. The exemplary system includes a network processor configured in a particular manner in order to illustrate the techniques of the invention. It should be understood, however, that the invention is more generally applicable to any processor in which it is desirable to provide improved table-based scheduling operations.

A "processor" as the term is used herein may be implemented, by way of example and without limitation, utilizing elements such as those commonly associated with a microprocessor, central processing unit (CPU), digital signal processor (DSP), application-specific integrated circuit (ASIC), or other type of data processing device, as well as portions and combinations of such elements.

The present invention in an illustrative embodiment improves scheduling operations in a network processor or other processor through the use of a table-based scheduling technique which allows multiple transmission elements to be assigned to the same transmission time slot, while also maintaining a desired traffic shaping for the transmitted data blocks.

Figure 1:
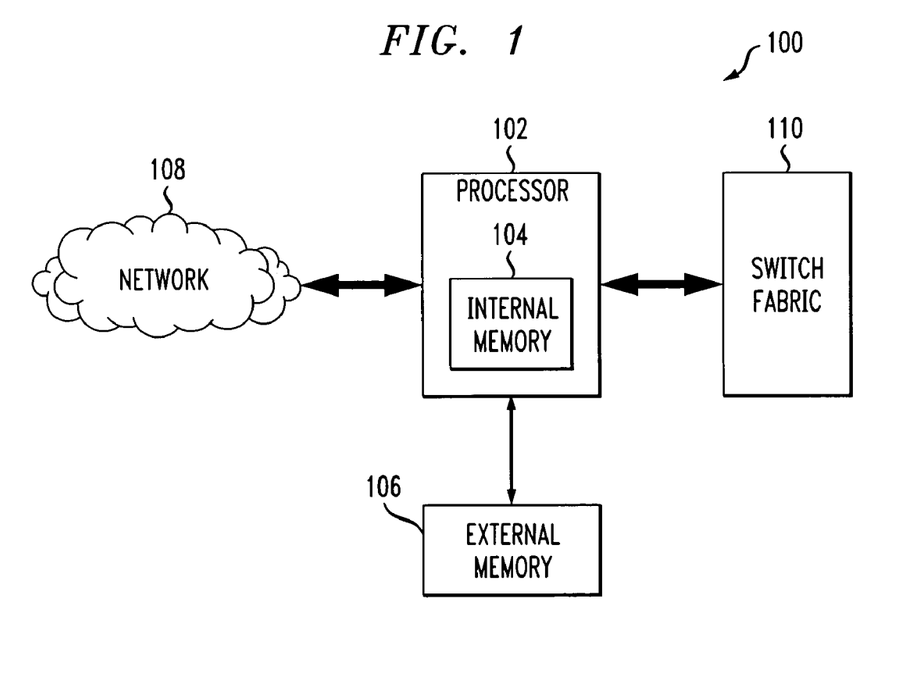
FIG. 1 is a simplified block diagram of an illustrative embodiment of a processing system in which the present invention is implemented.

FIG. 1 shows a network processing system 100 in which the invention is implemented. The system 100 includes a network processor 102 having an internal memory 104. The network processor 102 is coupled to an external memory 106 as shown, and is configured to provide an interface for communicating cells, packets, protocol data units (PDUs) or other arrangements of data between a network 108 and a switch fabric 110. All such arrangements of data are intended to be encompassed by the general term "data block" as used herein. The processor 102 and its associated external memory 106 may be implemented, e.g., as one or more integrated circuits installed on a line card or port card of a router or switch. In such a configuration, the switch fabric 110 is generally considered to be a part of the router or switch.

Figure 2:
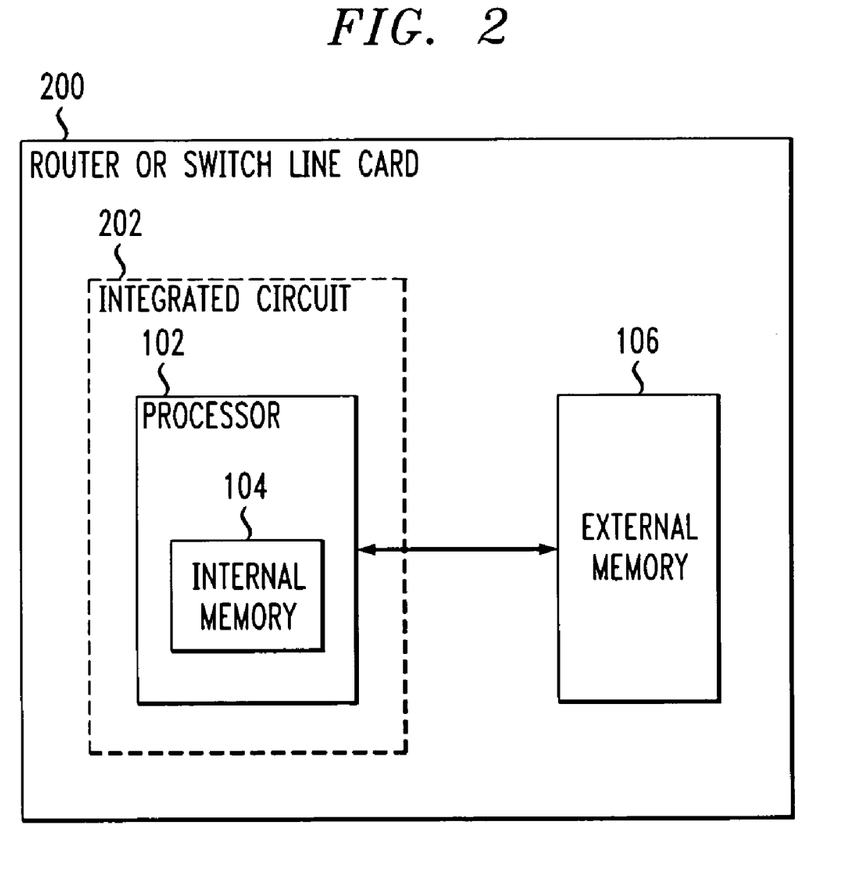
FIG. 2 illustrates one possible implementation of a network processor of the FIG. 1 system as an integrated circuit installed on a line card of a router or switch.

FIG. 2 illustrates an example router or switch line card embodiment of a portion of the system 100 of FIG. 1. In this embodiment, the processing system comprises a line card 200 having at least one integrated circuit 202 installed thereon. The integrated circuit 202 comprises network processor 102 which has internal memory 104. The network processor 102 interacts with external memory 106 on the line card 200. The external memory 106 may serve, e.g., as an external static random access memory (SRAM) or dynamic random access memory (DRAM) for the network processor integrated circuit 202. Such memories may be configured in a conventional manner. A suitable host processor may also be installed on the line card 200, and used for programming and otherwise controlling the operation of one or more network processor integrated circuits on the line card 200.

The portion of the processing system as shown in FIGS. 1 and 2 is considerably simplified for clarity of illustration. It is to be appreciated, however, that the processing system may comprise a router or switch which includes multiple line cards such as that shown in FIG. 2, and that each of the line cards may include multiple integrated circuits. A similar embodiment may be implemented in the form of a port card.

It should also be understood that the particular arrangements of system elements shown in FIGS. 1 and 2 are by way of illustrative example only. More specifically, as previously noted, the invention can be implemented in any type of processor, and is not limited to any particular network-based processing application.

Figure 3:
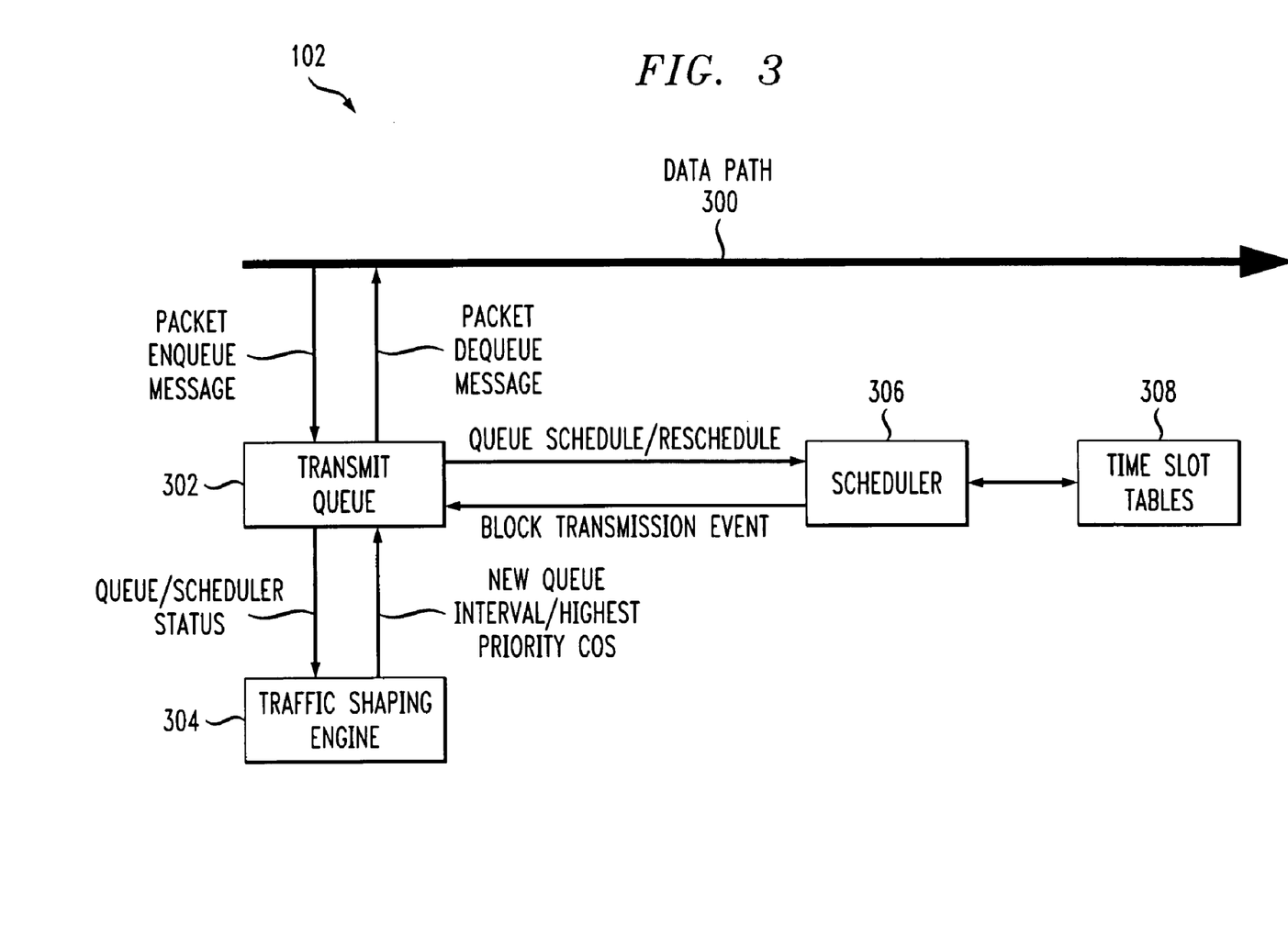
FIG. 3 is a more detailed view of a network processor of the FIG. 1 system configured in accordance with the techniques of the invention.

FIG. 3 shows a more detailed view of the network processor 102 in the illustrative embodiment of the invention. The network processor 102 in this embodiment includes a data path 300, a transmit queue 302, a traffic shaping engine 304, a scheduler 306, and a set of time slot tables 308.

The data path 300 may represent one or more processing elements which collectively provide a path for data blocks in passing through the processor 102. Such data path elements may be configured in a conventional manner well understood by those skilled in the art, and are therefore not described in further detail herein.

The transmit queue 302 preferably has a plurality of transmission elements associated therewith. For example, the transmit queue 302 may comprise a plurality of transmission queues and associated control logic, with each of the transmission queues corresponding to a transmission element. It should be noted, however, that the term "transmission element" as used herein is intended to be construed more generally so as to encompass any source of one or more data blocks that are to be scheduled for transmission in the network processor 102.

The transmit queue 302 in this embodiment is coupled to the traffic shaping engine 304 and to the scheduler 306, and provides an interface between these elements and the data path 300. In general, the transmit queue 302 supplies time slot requests from transmission elements associated therewith to the scheduler 306 in accordance with one or more traffic shaping requirements established by the traffic shaping engine 304 for the transmission of the data blocks from the transmission elements of the transmit queue 302.

Packets or other data blocks can be enqueued in transmission elements of the transmit queue 302 from the data path 300, e.g., in conjunction with packet enqueue messages and associated data blocks received from the data path 300.

Similarly, packets or other data blocks can be dequeued from the transmission elements to the data path 300 upon transmission, e.g., in conjunction with packet dequeue messages and associated data blocks sent to the data path 300.

The traffic shaping engine 304 is coupled to the scheduler 306 via the transmit queue 302, and establishes the traffic shaping requirements in the illustrative embodiment. As is shown in the figure, the traffic shaping engine 304 receives information regarding queue and scheduler status from the transmit queue 302, and generates traffic shaping information that is returned to the transmit queue 302. This information may include information such as queue transmission interval and prioritization for establishing a class of service (CoS) or other desired service level for one or more of the transmission elements or their corresponding network connections. The term "traffic shaping requirement" as used herein is intended to include without limitation information that at least partially specifies a service level for one or more of the transmission elements or their corresponding network connections, e.g., a desired transmission rate, transmission interval, transmission order or prioritization for one or more of the transmission elements. The traffic shaping engine 304 is an example of an element referred to more generally herein as "traffic shaping circuitry." In other embodiments, traffic shaping circuitry may be configured to include, in addition to the traffic shaping engine 304, one or more elements or functions of the transmit queue 302, or other arrangements of circuitry capable of establishing traffic shaping requirements, as will be readily apparent to those skilled in the art.

The scheduler 306 is responsible for scheduling data blocks for transmission from the queues or other transmission elements of the transmit queue 302. In accordance with the invention, the scheduler 306 utilizes one or more of the time slot tables 308 to schedule the data blocks for transmission in a manner that substantially maintains the traffic shaping requirement established by the traffic shaping engine 304 in the presence of collisions between requests from the transmission elements for each of one or more of the time slots.

As shown in the figure, the scheduler 306 receives transmission requests, e.g., in the form of queue schedule or reschedule commands, from the transmit queue 302, and processes these requests in accordance with information stored in the time slot tables 308 to generate block transmission event commands that are returned to the transmit queue 302.

It should be emphasized that the particular information shown in FIG. 3 as being communicated between the elements 300, 302, 304 and 306 thereof is by way of example only, and not intended to limit the scope of the invention in any way. Those skilled in the art will recognize that other messages, commands or information transfer configurations may be used.

The scheduler 306 is an example of an element referred to more generally herein as "scheduling circuitry." In other embodiments, scheduling circuitry may include in addition to the scheduler 306 one or more of the time slot tables 308, one or more elements or functions of the transmit queue 302, or other arrangements of circuitry capable of implementing the scheduling techniques of the present invention. Thus, although shown as separate from the scheduler 306 in the figure, the time slot tables 308 or suitable portions thereof may be incorporated into scheduling circuitry in accordance with the invention.

The time slot tables 308 may be stored at least in part in the internal memory 104 of the network processor 102, and may also or alternatively be stored at least in part in the external memory 106 of the network processor 102.

A given one of the time slot tables 308 includes a plurality of locations, each corresponding generally to a transmission time slot. As will be described in conjunction with FIG. 4, each location in the table includes multiple physical memory locations and maps directly to a transmission time slot. Each of the locations is preferably configured for storing identifiers of at least two of the transmission elements from transmit queue 302 that have requested transmission of a block of data in the corresponding time slot. A time slot may be viewed as the amount of absolute time it takes to transmit a single block of data over interface or other network connection supported by the network processor 102. Each of the tables in the set of tables 308 may be associated with a particular interface or other network connection. It is to be appreciated that the invention does not require any particular size or configuration of data blocks.

The scheduler 306 provides dynamic maintenance of the time slot tables 308, such that identifiers of requesting transmission elements are entered into table locations on a demand basis. That is, as the transmission elements have data blocks to transmit, their identifiers are entered into the appropriate table locations. If a transmission element has no data block to transmit, then its identifier is not entered into the table.

Figure 4:
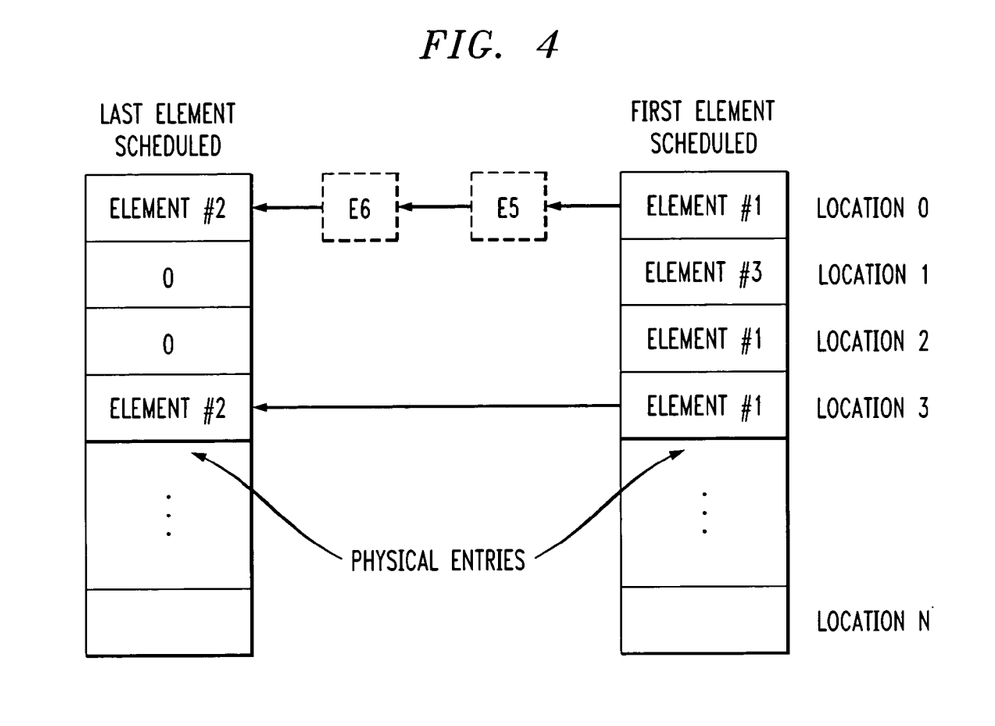
FIG. 4 shows an illustrative time slot table utilizable in a scheduling operation of the FIG. 3 processor in accordance with the invention.

FIG. 4 shows an example of one of the time slot tables 308. The table includes N+1 locations denoted Location 0, Location 1, . . . Location N. Each of the locations in this embodiment is capable of storing two transmission element identifiers, namely, an identifier of a first scheduled transmission element and an identifier of a last scheduled transmission element. The state of the table represents the manner in which data blocks will be transmitted out over a particular interface or other network connection supported by the network processor 102. For example, assume that N=3, such that there are a total of four locations in the table, and that these four locations have entries as shown in the figure. An entry of "0" indicates that there is no transmission element identifier stored in the corresponding portion of the location. Locations 0 and 3 each have identifiers of both an Element #1 and an Element #2 stored therein, as respective first and last scheduled elements, while locations 1 and 2 have the identifiers of Element #2 and Element #3, respectively, stored therein as first scheduled elements and "0" entries as last scheduled elements.

As a result of this example storage of transmission element identifiers, and assuming for the time being that the elements E5 and E6 shown in dashed outline are not part of the scheduling, Element #1 will receive exactly one-half of the bandwidth of the network connection, while Element #2 and Element #3 will receive one-third and one-sixth, respectively, of the bandwidth of the network connection. It can therefore be seen that the manner in which the table is populated with transmission element identifiers will determine the transmission bandwidth assigned to each of the transmission elements. This assignment is made in accordance with one or more traffic shaping requirements established by the traffic shaping engine 304 and communicated to the scheduler 306 via the transmit queue 302.

The assignment of transmission element identifiers to table locations also determines the relative "clumping" or burstiness of the transmission elements, also referred to herein as delay variation.

It should be noted that the particular multi-entry table location arrangement shown in FIG. 4 is by way of example only. In other embodiments, a given table location may include more than two entries. As another example, only a designated subset of the table locations may include multiple entries.

In a demand-based scheduling arrangement such as that illustrated in conjunction with FIGS. 3 and 4, there may be collisions between transmission elements that request the same time slot for transmission. By configuring the table locations for the storage of multiple transmission identifiers, the invention allows the corresponding network processor to accommodate collisions between requesting transmission elements. The particular scheduling operations used in conjunction with this table location configuration will be described in greater detail below.

As illustrated in FIG. 4, the first and last scheduled elements having identifiers stored in the corresponding portions of the corresponding table locations may have additional transmission elements linked therebetween, so as to allow a given table entry to accommodate any number of colliding transmission requests. In the FIG. 4 example, Element #1 and Element #2 in the respective first and last scheduled element portions of Location 0 may have the additional elements E5 and E6 linked therebetween as shown. The designators E5 and E6 denote Element #5 and Element #6, respectively, which when present are assumed to have collided with Element #1 and Element #2 in requesting the first time slot in the FIG. 4 table associated with Location 0.

The transmission element identifiers are therefore preferably configured with a multi-bit structure for allowing a given one of the transmission element identifiers to be linked to another of the transmission element identifiers. For example, a portion of the given identifier may include a number of bits which uniquely specify another identifier to which the given identifier is linked. As a result, a linked list of such identifiers can be created. The invention in the illustrative embodiment utilizes this identifier linking mechanism to establish a linked list of transmission element identifiers when more than two transmission elements have requested the same time slot for transmission. If exactly two transmission elements have requested the same time slot for transmission, an identifier of a first one of the elements is entered in the first scheduled element portion of the location, and an identifier of the second one of the elements is entered in the second scheduled element portion of the location, such that the above-described linking mechanism is not needed.

More particularly, in the event of a collision between more than two transmission elements requesting a given one of the time slots, an identifier of a first one of the requesting transmission elements is entered into a first portion of the corresponding location in the time slot table, an identifier of a final one of the requesting elements is entered into a second portion of the corresponding location in the time slot table, and an identifier of an additional one of the requesting elements is linked to at least one of the identifier of the first requesting element and the identifier of the second requesting element, a linked list of the multiple requesting elements thereby being created for the corresponding location in the time slot table.

The transmission elements linked to a given element that has its identifier stored in the first portion of a given time slot table location may be referred to as being in a dynamic "waiting room," i.e., awaiting selection for transmission but not yet assigned to an actual transmission time slot in the time slot table. The waiting room thus contains elements that have been deferred due to time slot request collisions. It should be noted that the element having its identifier entered in the first portion of the table location may also be referred to as being in the waiting room. Alternatively, the waiting room definition may exclude this element. The latter is assumed for the example set of pointers shown in FIG. 5.

Upon transmission of a data block from one of the requesting transmission elements in the linked list of elements, a determination is made as to whether there are any further elements linked to that element. If there are any further elements, the identifier of the next such element is determined and the transmission of a data block therefrom is scheduled. This process continues until data blocks have been transmitted for all of the requesting elements. The set of pointers, to be described in conjunction with FIG. 5, is used to process the linked lists in a manner that maintains established traffic shaping requirements.

Figure 5:
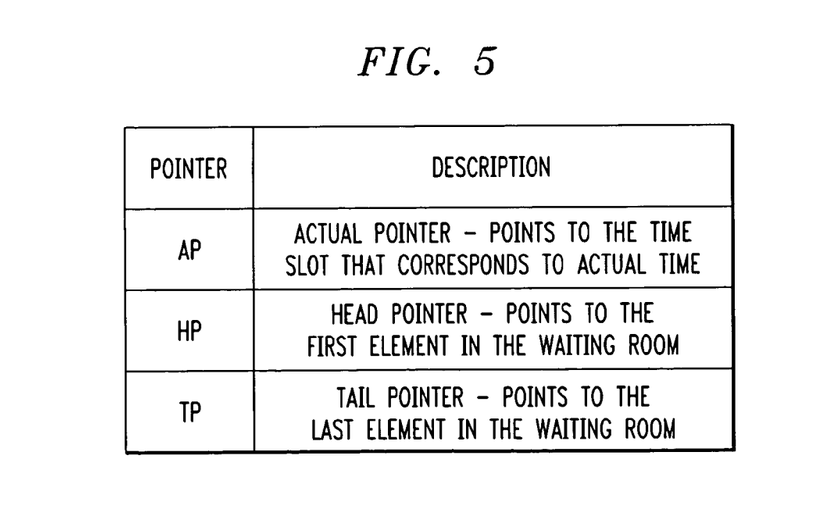
FIG. 5 shows a set of pointers utilized in a scheduling operation in an illustrative embodiment of the present invention.

FIG. 5 shows the set of pointers used in the illustrative embodiment. These include an actual pointer (AP) pointing to a location in the time slot table corresponding to actual time, a head pointer (HP) pointing to a first element of a linked list of multiple requesting transmission elements associated with a given time slot, i.e., a first element in the above-described waiting room, and a tail pointer (TP) pointing to a final element of the linked list of multiple requesting transmission elements associated with the given time slot, i.e., a last element in the waiting room. The AP thus tracks actual transmission time through the table, i.e., indicates the particular time slot for which transmission will occur, while the HP and TP define the waiting room. It should be noted that each table in the set of time slot tables 308 will generally have its own set of pointers.

The actual pointer advances by one table location for each of the data blocks transmitted, i.e., for each transmission event involving the corresponding time slot table. The head pointer and tail pointer collectively define the above-noted dynamic waiting room for a subset of the multiple requesting transmission elements associated with the given time slot, i.e., the multiple requesting transmission elements other than the one having its identifier entered in the first portion of the table location.

Also associated with the set of pointers for a given time slot table in the illustrative embodiment is a counter which specifies the number of times a given requesting element or set of elements have been moved to the waiting room. It should be noted that the counter only places a lower bound on this number since multiple elements moved in a single transaction will result in a waiting room depth increase of one. The counter may be implemented in the scheduler 306 or elsewhere in the processor 102, as will be apparent to those skilled in the art. Other types of counters may be used.

A given requesting transmission element that has previously had a data block scheduled for transmission is subsequently assigned to a location in the time slot table for transmission of its next data block in accordance with the following equation:

Assigned Time Slot=AP−Waiting Room Depth+Requested Time Slot Interval, where AP denotes the actual pointer, the waiting room depth is the value of the above-noted counter, and the requested time slot interval is the time slot interval requested by the requesting transmission element. This equation provides a mechanism for determining in which time slot to reschedule an element to maintain a requested rate or other traffic shaping requirement given that elements are being moved from the time slot table itself to the waiting room.

It should be emphasized that the above equation corresponds to a "rescheduling" of the transmission element, i.e., a scheduling of the next data block for transmission from the element subsequent to scheduling of its prior data block. In this rescheduling equation, the transmission element via the requested time slot interval indicates where it would like its next transmission to be scheduled given its previous transmission. For an initial scheduling for a given transmission element, the following equation may be used:

Assigned Time Slot=AP+Requested Time Slot Interval.

In this initial scheduling equation, the transmission element indicates via the requested time slot interval where it would like its initial transmission to be scheduled relative to actual time. The requested time slot interval in the above equations may be specified in terms of time slot units, e.g., 1 time slot unit, 2 time slot units, etc.

The above-described pointers are maintained by the scheduler 306 in controlling the time slot tables 308 in accordance with traffic shaping requirements established by the traffic shaping engine 304. The transmit queue 302 receives one or more traffic shaping requirements from the traffic shaping engine 304 and supplies scheduling and rescheduling requests to the scheduler 306 in accordance with the requirement(s). As indicated above, the table-based scheduling is implemented by the scheduler 306 in a manner that maintains the requirement(s) regardless of the collisions.

An example of the operation of the scheduler 306 utilizing a time slot table of the type shown in FIG. 4 and the set of pointers shown in FIG. 5 will now be described with reference to FIGS. 6 and 7.

Figure 6:
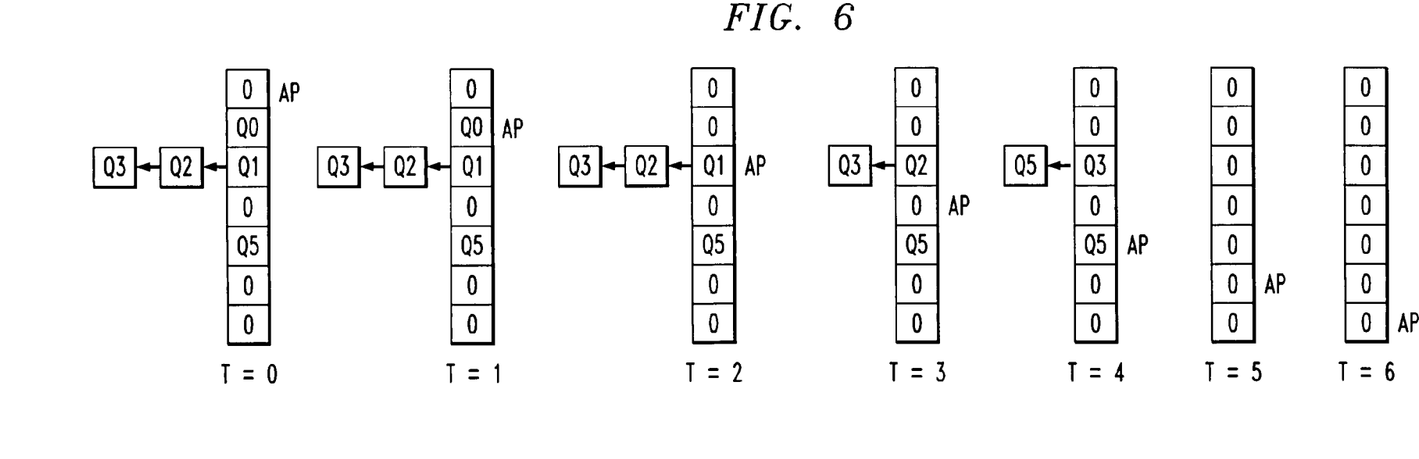
FIGS. 6 and 7 show examples of scheduling operations involving the FIG. 4 time slot table configuration and the FIG. 5 pointers in accordance with the techniques of the invention.

Referring initially to FIG. 6, the state of a time slot table having seven storage locations, each corresponding to a transmission time slot, is shown at each of seven different points in time denoted T=0, 1, 2, . . . 6. It should be understood that the particular number of table locations and time points shown is by way of example only.

At time T=0, transmission requests have been received from elements denoted Q0, Q1, Q2, Q3 and Q5. Element Q4 is not included because it is assumed for this example that no transmission request has been received from that element. Element Q0 has its identifier entered in the table location corresponding to the second time slot. As a result of a collision between requests from elements Q1, Q2 and Q3 for transmission in the third time slot, element Q1 has its identifier entered into the first portion of the table location, and is linked to element Q2, with element Q2 being similarly linked to element Q3, using the above-described linking mechanism. More particularly, the element Q1 points to element Q2, and the element Q2 points to Q3. Element Q3 has its identifier stored in the second portion of the table location. A linked list of elements Q1, Q2 and Q3 is therefore associated with the third time slot. Element Q5 has its identifier entered in the fifth time slot. The first, fourth, sixth and seventh time slots each have "0" entries at time T=0. AP points to the first time slot. Since AP is pointing to a time slot that has no transmission element associated therewith, no transmission is performed for this time slot.

At time T=1, AP has advanced by one time slot to point to the second of the seven time slots. This second time slot has an element that is requesting transmission, that is, element Q0. Element Q0 is therefore selected for transmission of a data block in the second time slot.

At time T=2, AP has advanced by one time slot to point to the third of the seven time slots. This third time slot has three elements that are requesting transmission, that is, elements Q1, Q2 and Q3. The table itself includes the entries for elements Q1 and Q3, with Q2 being linked between Q1 and Q3 in the manner previously described. Therefore, element Q1 is selected for transmission of a data block in the third time slot. Elements Q2 and Q3 are in the waiting room. HP points to element Q2, and TP points to element Q3.

At time T=3, element Q2 is selected for transmission in the fourth time slot. AP has advanced by one time slot as shown. Element Q3 remains in the waiting room, and both HP and TP point to element Q3.

At time T=4, element Q3 is selected for transmission in the fifth time slot. AP has again advanced by one time slot. Since AP is pointing to an entry that is valid, namely, element Q5 in the fifth time slot, this element is appended to the end of the waiting room as shown. Both HP and TP therefore point to element Q5.

At time T=5, element Q5 is selected for transmission in the sixth time slot. AP has again advanced by one time slot. The waiting room has been emptied.

At time T=6, there are no more elements requesting transmission. AP has again incremented by one time slot.

Figure 7:
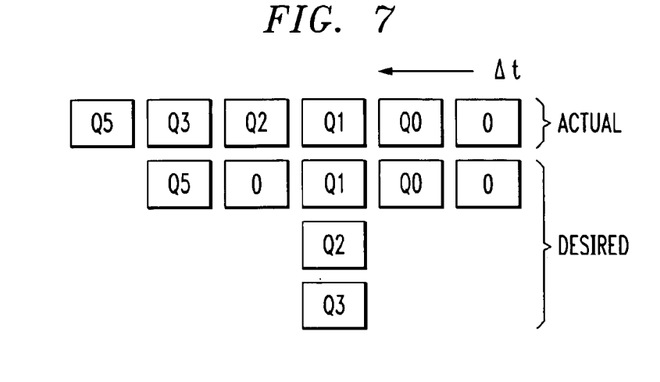

FIG. 7 shows the actual and desired orders of transmissions for the foregoing example. It can be seen that the worst case delay variation $\Delta t$ in this example is two time slots. The desired order of transmission may be viewed as one possible example of an "established traffic shaping requirement" as this term is used herein. The described scheduling approach has substantially maintained the established traffic shaping requirement in the presence of the collisions. The term "substantially maintained" as used herein with reference to an established traffic shaping requirement therefore intended to include any arrangement in which colliding transmission elements are linked from a single entry in the corresponding time slot table location, and then subsequently scheduled for transmission in the order in which they are linked.

In the above-described scheduling technique, as elements are deferred due to time slot table collisions, their transmission rates may decrease as the table attempts to converge around a "no collisions" state. It is expected that the transmission elements can accommodate any such a decrease as required through appropriate rate adjustment.

Also, it is apparent from the foregoing example that transmission elements entered into particular time slots do not necessarily transmit in those time slots. The movement of such elements into the waiting room is taken into account in the following rescheduling equation, which was also given previously and is repeated here for convenience:

Assigned Time Slot=AP−Waiting Room Depth+Requested Time Slot Interval.

It should be noted that the equation represents the latest time slot the element might have been in before it was moved. As such, the equation provides a pessimistic approximation, and a given element will therefore tend to be underutilized rather than overutilized. This may be important in certain applications, such as ATM networks, in which transmitting too fast can result in downstream discards because of policing.

The particular scheduling equation given above is not a requirement of the invention, and is instead offered by way of example. Those skilled in the art will recognize that other equations can be used, e.g., an equation corresponding to a less pessimistic approximation.

The above-described embodiments of the invention are intended to be illustrative only. For example, although the illustrative embodiment of FIG. 3 utilizes a scheduler which is separate from its associated time slot tables, these tables or portions thereof may be incorporated into scheduling circuitry in accordance with the invention. Similarly, although a separate transmit queue having multiple transmission elements is described in conjunction with the FIG. 3 embodiment, the associated functionality may be distributed across scheduling circuitry and traffic shaping circuitry in accordance with the invention. Other embodiments can use different types and arrangements of processing elements for implementing the described functionality. In addition, although each location in the time slot table includes storage space for two transmission element identifiers, this is by way of example, and additional storage space may be provided in each of at least a subset of the locations so as to permit the storage of more than two identifiers in a given table location. These and numerous other alternative embodiments within the scope of the following claims will be apparent to those skilled in the art.

What is claimed is:

1. A processor comprising:
scheduling circuitry for scheduling data blocks for transmission from a plurality of transmission elements;
the scheduling circuitry having at least one time slot table accessible thereto;
wherein the scheduling circuitry is configured for utilization of the at least one time slot table in scheduling the data blocks for transmission, the time slot table comprising a plurality of locations, a given one of the locations corresponding to a transmission time slot and being configurable for storing identifiers of at least two of the transmission elements that have generated colliding requests to transmit respective data blocks in the corresponding time slot; and
wherein less than all of said at least two transmission elements that have their respective identifiers stored in the given location and have generated the colliding requests are permitted to transmit a data block in the corresponding time slot.

2. The processor of claim 1 wherein the time slot table is stored at least in part in an internal memory of the processor.

3. The processor of claim 1 wherein the time slot table is stored at least in part in an external memory coupled to the processor.

4. The processor of claim 1 wherein a given one of the locations in the time slot table stores in a first portion thereof an identifier of a first one of the transmission elements that has requested transmission of a block of data in the corresponding time slot and stores in a second portion thereof an identifier of a second one of the transmission elements that has requested transmission of a block of data in the corresponding time slot.

5. The processor of claim 1 wherein one or more of the data blocks comprise data packets.

6. The processor of claim 1
wherein the scheduling circuitry provides dynamic maintenance of the time slot table such that identifiers of requesting transmission elements are entered into the table locations on a demand basis.

7. The processor of claim 1
wherein the identifiers of the transmission elements comprise a structure for allowing a given one of the transmission element identifiers to be linked to another of the transmission element identifiers.

8. A processor comprising:
scheduling circuitry for scheduling data blocks for transmission from a plurality of transmission elements;
the scheduling circuitry having at least one time slot table accessible thereto;
wherein the scheduling circuitry is configured for utilization of the at least one time slot table in scheduling the data blocks for transmission, the time slot table comprising a plurality of locations, each of the locations corresponding to a transmission time slot and being configurable for storing identifiers of at least two of the transmission elements;
wherein the identifiers of the transmission elements comprise a structure for allowing a given one of the transmission element identifiers to be linked to another of the transmission element identifiers; and
wherein in the event of a collision between multiple transmission elements requesting a given one of the time slots, an identifier of a first one of the requesting transmission elements is entered into a first portion of the corresponding location in the time slot table, an identifier of a final one of the requesting elements is entered into a second portion of the corresponding location in the time slot table, and an identifier of an additional one of the requesting elements is linked to at least one of the identifier of the first requesting element and the identifier of the second requesting element, a linked list of the multiple requesting elements thereby being created for the corresponding location in the time slot table.

9. The processor of claim 8 wherein upon transmission of a data block from one of the requesting transmission elements in the linked list of elements, a determination is made as to whether there are any further elements linked to that element, and for a given such further element the transmission of a data block therefrom is scheduled.

10. The processor of claim 1
wherein the scheduling circuitry maintains a set of pointers for the time slot table, the set of pointers comprising one or more of:
an actual pointer pointing to a location in the time slot table corresponding to actual time;
a head pointer pointing to a first element of a linked list of multiple requesting transmission elements associated with a given time slot; and
a tail pointer pointing to a final element of the linked list of multiple requesting transmission elements associated with the given time slot.

11. The processor of claim 10 wherein the actual pointer advances by one table location for each of the data blocks transmitted.

12. A processor comprising:
scheduling circuitry for scheduling data blocks for transmission from a plurality of transmission elements;
the scheduling circuitry having at least one time slot table accessible thereto;
wherein the scheduling circuitry is configured for utilization of the at least one time slot table in scheduling the data blocks for transmission, the time slot table comprising a plurality of locations, each of the locations corresponding to a transmission time slot and being configurable for storing identifiers of at least two of the transmission elements;
wherein the scheduling circuitry maintains a set of pointers for the time slot table, the set of pointers comprising one or more of:
an actual pointer pointing to a location in the time slot table corresponding to actual time;
a head pointer pointing to a first element of a linked list of multiple requesting transmission elements associated with a given time slot; and a tail pointer pointing to a final element of the linked list of multiple requesting transmission elements associated with the given time slot; and wherein the head pointer and tail pointer collectively define a dynamic waiting room for at least a subset of the multiple requesting transmission elements associated with the given time slot.

13. A processor comprising:

scheduling circuitry for scheduling data blocks for transmission from a plurality of transmission elements;

the scheduling circuitry having at least one time slot table accessible thereto; and wherein the scheduling circuitry is configured for utilization of the at least one time slot table in scheduling the data blocks for transmission, the time slot table comprising a plurality of locations, each of the locations corresponding to a transmission time slot and being configurable for storing identifiers of at least two of the transmission elements; and wherein the scheduling circuitry maintains a set of pointers for the time slot table, the set of pointers comprising one or more of:

an actual pointer pointing to a location in the time slot table corresponding to actual time;

a head pointer pointing to a first element of a linked list of multiple requesting transmission elements associated with a given time slot; and a tail pointer pointing to a final element of the linked list of multiple requesting transmission elements associated with the given time slot;

wherein the processor further comprises a counter which specifies a number of times a set of one or more of the multiple requesting transmission elements are placed in one or more linked lists of such elements associated with one or more of the time slots.

14. The processor of claim 13 wherein a given requesting transmission element is assigned to a location in the time slot table in accordance with the following equation:

Assigned Time Slot=AP−Waiting Room Depth+Requested Time Slot Interval, where AP denotes the actual pointer, the waiting room depth is the value of the counter, and the requested time slot interval is the time slot interval requested by the requesting transmission element.

15. The processor of claim 1 further comprising a transmit queue having traffic shaping circuitry coupled thereto, the transmit queue being coupled to the scheduling circuitry and supplying time slot requests from transmission elements to the scheduling circuitry in accordance with a traffic shaping requirement established by the traffic shaping circuitry.

16. The processor of claim 1 wherein the processor comprises the at least one time slot table.

17. The processor of claim 1 wherein the processor comprises a network processor configured to provide an interface for data block transfer between a network and a switch fabric.

18. The processor of claim 1 wherein the processor is configured as an integrated circuit.

19. A method for use in a processor, the method comprising:

scheduling data blocks for transmission from a plurality of transmission elements;

wherein the scheduling step utilizes at least one time slot table to schedule the data blocks for transmission, the time slot table comprising a plurality of locations, a given one of the locations corresponding to a transmission time slot and being configurable for storing identifiers of at least two of the transmission elements that have generated colliding requests to transmit respective data blocks in the corresponding time slot; and wherein less than all of said at least two transmission elements that have their respective identifiers stored in the given location and have generated the colliding requests are permitted to transmit a data block in the corresponding time slot.

20. An article of manufacture comprising a computer-readable storage medium for use in conjunction with a processor, the medium storing one or more software programs for use in scheduling data blocks for transmission from a plurality of transmission elements, utilizing at least one time slot table, the time slot table comprising a plurality of locations, a given one of the locations corresponding to a transmission time slot and being configurable for storing identifiers of at least two of the transmission elements that have generated colliding requests to transmit respective data blocks in the corresponding time slot;

wherein less than all of said at least two transmission elements that have their respective identifiers stored in the given location and have generated the colliding requests are permitted to transmit a data block in the corresponding time slot; and wherein the one or more programs when executed implement the step of scheduling the data blocks for transmission from the plurality of transmission elements.

* * * * *